Patented Feb. 27, 1945

2,370,118

UNITED STATES PATENT OFFICE 2,370,118

ISOMERIZATION PROCESS

William Nelson Axe, Bartlesville, Okla., assignor to Phillips Petroleum Company, a corporation of Delaware No Drawing. Application October 5, 1942,
Serial No. 460,862

5 Claims. (Cl. 260—683.5)

The present invention relates to new and improved methods for the conversion of paraffinic hydrocarbons to other hydrocarbons of the same molecular weight but of more highly-branched structure, in the process known as isomerization. This invention relates more particularly to a method which utilizes the promoting action of a new group of catalysts displaying exceptional activity for isomerization.

Light normal or slightly-branched paraffin hydrocarbons often obtained from natural gasolines, and heavier normally liquid straight-chain paraffins commonly found in many straight run gasolines are fairly plentiful. Further, they are deficient in antiknock properties and constitute a very poor intermediate in the preparation of high octane fuels either by blending or by synthesis. As a result, the lighter normal paraffins in particular, such as normal butane and normal pentane, too volatile for quantity inclusion in motor fuel, have often been considered less valuable than the corresponding isoparaffins. Accordingly, there is great commercial interest in processes to convert the normal paraffin hydrocarbons to isomers either more valuable in themselves or more useful as starting materials in the synthesis of high octane blending agents.

Catalytic processes have been proposed for the isomerizing of paraffin hydrocarbons and a variety of catalysts have been described in connection with these processes. A number of these operations have utilized aluminum chloride, either alone or modified by additive, promoter and/or inert carrier agents. Complexes of hydrocarbon and aluminum chloride have also been suggested for the treatment of petroleum fractions for isomerization and other purposes. Such prior processes have been difficult and expensive to operate, since the conditions set up in most cases rapidly destroyed the activity of the catalyst. Moreover, the activity of the catalyst was not controlled, so that various other reactions in addition to isomerization were promoted, with the result that a variety of products was obtained and the yields of desired materials was not always uniform.

It is an object of this invention to disclose a process for the isomerization of paraffinic hydrocarbons. It is another object of this invention to provide a new group of catalysts of high activity in isomerization of paraffins with concurrent low tendency to promote undesired side reactions. Another object of this invention is to disclose suitable operating conditions in order to obtain the best returns from the process. A still further object of the present invention is a process for the isomerization of paraffinic hydrocarbons utilizing as novel catalytic material therefor a combination of boron trifluoride and water, with or without the addition of promoters. Specifically, it is an object of the present invention to utilize such catalysts promoted by the addition of minor proportions of hydrogen halides, particularly hydrogen fluoride. Additional objects will become apparent hereinafter.

It has now been found that by employing the novel isomerization catalyst described herein, this reaction may be effectively performed without the primary disadvantages encountered in using the catalysts of the prior art. This process is of importance commercially since it provides a method for direct production of isomeric paraffins, particularly exemplified by isobutane and isopentane, from the corresponding normal paraffins. The resulting isoparaffins are of great value in production of aviation fuels and in the preparation of isoolefines for numerous uses, particularly types of so-called synthetic rubber.

In the present invention the isomerization is performed by using catalysts prepared from boron trifluoride and water, with or without the incorporation of a suitable promoter, particularly of the hydrogen halide type and especially hydrogen fluoride. The catalyst may be prepared by saturating water with boron trifluoride, preferably at ordinary temperatures probably forming a hydrate of boron trifluoride. It is generally advisable to saturate while maintaining the receptacle in an ice bath or the like to counterbalance heat liberated during solution of the $BF_3$. Where a promoter such as hydrogen fluoride is to be used, it may be introduced into the water solution, preferably before the introduction of $BF_3$.

One convenient method of preparing catalysts promoted with hydrofluoric acid comprises the saturation of aqueous solutions containing from about 20 to about 50 weight per cent of HF with gaseous $BF_3$. The compositions thus obtained contain from about 5 to about 20 weight per cent of HF. In a similar manner, other hydrogen halides such as HCl may be used as promoters.

The process may be carried out by contacting the paraffin to be isomerized, such as butane, with the catalyst in a reaction zone at temperatures in the range of about 100° F. to 400° F. and pressures in the range of about 50 to 500 pounds per square inch gage. In liquid phase operation, the relative volumes of hydrocarbon and catalyst in the reaction mixture are chosen to insure intimate contact of the immiscible phases.

Satisfactory operation is ordinarily obtained with from about 20 to about 60 volume per cent of catalyst in the reaction mixture.

The reactants may be contacted with the catalyst in either vapor or liquid phase and the temperature and pressures are so selected as to give the desired phase. The catalyst is desirably maintained substantially in liquid phase during the reaction and intimate contact may be obtained in various ways as by mechanical agitation or flow through beds of contact material, etc. In general the reaction time will depend upon the temperature of reaction and will vary from about 20 minutes or less to 2 hours or more.

The reaction may be either batch or continuous and in either case the spent or partially spent catalyst is separated from the reactants by settling or the like. The reaction product may be conducted to a fractionator where the isoparaffins are separated from unreacted paraffins which are returned to the reaction zone. Partially spent catalyst may also be returned to the reaction zone, and after becoming completely spent may be separated from the system, or this may be done by continuously removing a portion of the spent catalyst from the system while adding fresh catalyst. The catalyst activity may be maintained by periodic or continuous addition of small amounts of $BF_3$ to the reaction zone or to the catalyst prior to re-introduction into the reaction zone. When the promoter is used it may also be added to the zone in this manner. Gaseous $BF_3$ carried out in the effluent hydrocarbons may be recovered in the fractionating system and returned to the reaction zone or the catalyst preparation step.

Example I

A feed stock containing 96% normal butane and the balance propane and isobutane was passed in liquid phase into a reaction vessel containing a liquid catalyst composition prepared by saturating water with gaseous boron trifluoride at 100–120° F. The mol ratio of water to boron trifluoride in the resulting composition was about 1.1. Intimate contact between the hydrocarbon and catalyst phases is maintained in the reactor by means of a mechanical stirrer. As fresh feed was added to the reactor, a corresponding volume of the hydrocarbon-catalyst mixture is separated in a subsequent settling zone from which catalyst was returned to the reactor. The reactor is maintained at 275° F. and 400 pounds gage pressure so that both hydrocarbons and catalyst are substantially in liquid phase. The rate of flow of the hydrocarbon feed stock is regulated to give a contact time of about 90 minutes, with approximately equal volumes of hydrocarbon and catalyst in the reaction vessel. The hydrocarbon effluent from the settling zone is stripped of light gases and hydrocarbons lower-boiling than isobutane, and the $C_4$ fraction is fractionated to separate and recover isobutane. Gaseous $BF_3$ may be recycled in the feed stream together with unconverted normal butane separated in the final fractionation.

Example II

A catalyst composition may be prepared by saturating a 50 per cent aqueous solution of hydrofluoric acid with gaseous boron trifluoride. This catalyst contains about 17 per cent by weight of hydrofluoric acid and may be employed to treat the $C_4$ feed stock of Example I in a similar continuous operation. With the reactor at 225° F. and 300 pounds gage pressure, the contact time of hydrocarbon with the catalyst may be 60 minutes or more, depending on the desired extent of isomerization. Boron trifluoride carried out in the effluent hydrocarbons may be separated and recycled in the $C_4$ feed stock. Unconverted normal butane is also recycled after separation from isobutane by fractionation. When the activity of the catalyst declines after a long period of use, it may be restored to substantially its original activity by resaturation with $BF_3$.

While the foregoing examples are specific to mixtures containing normal butane, the same general principles may be applied to the isomerization of other paraffinic hydrocarbons, such as pentanes, hexanes, etc., to form more highly branched chain compounds having the same number of carbon atoms.

I claim:

1. A process for the isomerization of normal paraffins to form isoparaffins which comprises contacting normal paraffins having at least four carbon atoms per molecule with a liquid catalyst consisting of water saturated with boron trifluoride, under isomerizing conditions.

2. A process according to claim 1 in which said liquid catalyst consists of water saturated with boron trifluoride promoted by the incorporation of a minor proportion of hydrogen fluoride dissolved in said water prior to its saturation with boron trifluoride.

3. A process for the isomerization of normal butane to form isobutane which comprises contacting normal butane with a liquid catalyst consisting of water saturated with boron trifluoride and promoted by the addition of a minor proportion of hydrogen fluoride, at an isomerization temperature between about 100° F. to 400° F. and a pressure between about 50 to 500 pounds per square inch gage for a time sufficient to convert normal butane to isobutane.

4. A process for the isomerization of a low-boiling paraffin hydrocarbon having at least four carbon atoms per molecule, which comprises subjecting such a low-boiling paraffin to the action of a liquid catalyst consisting of water saturated with boron trifluoride under conditions such that isomerization of said paraffin hydrocarbon is effected.

5. A process for the isomerization of a low-boiling paraffin hydrocarbon having at least four carbon atoms per molecule, which comprises intimately admixing a low-boiling paraffin hydrocarbon having at least four carbon atoms per molecule with a liquid isomerization catalyst consisting of an aqueous solution of hydrogen fluoride containing between about 20 and about 50 per cent by weight of hydrogen fluoride saturated with boron trifluoride, maintaining said intimate admixture at an isomerization temperature between about 100° and 400° F. for a time sufficient to effect isomerization of said paraffin, and separating from effluents of said isomerization a hydrocarbon fraction comprising a paraffin isomeric with the first said paraffin.

WILLIAM NELSON AXE.